J. B. RHODES.
DUMP CAR.
APPLICATION FILED MAY 19, 1916.
1,256,164. Patented Feb. 12, 1918.
2 SHEETS—SHEET 1.
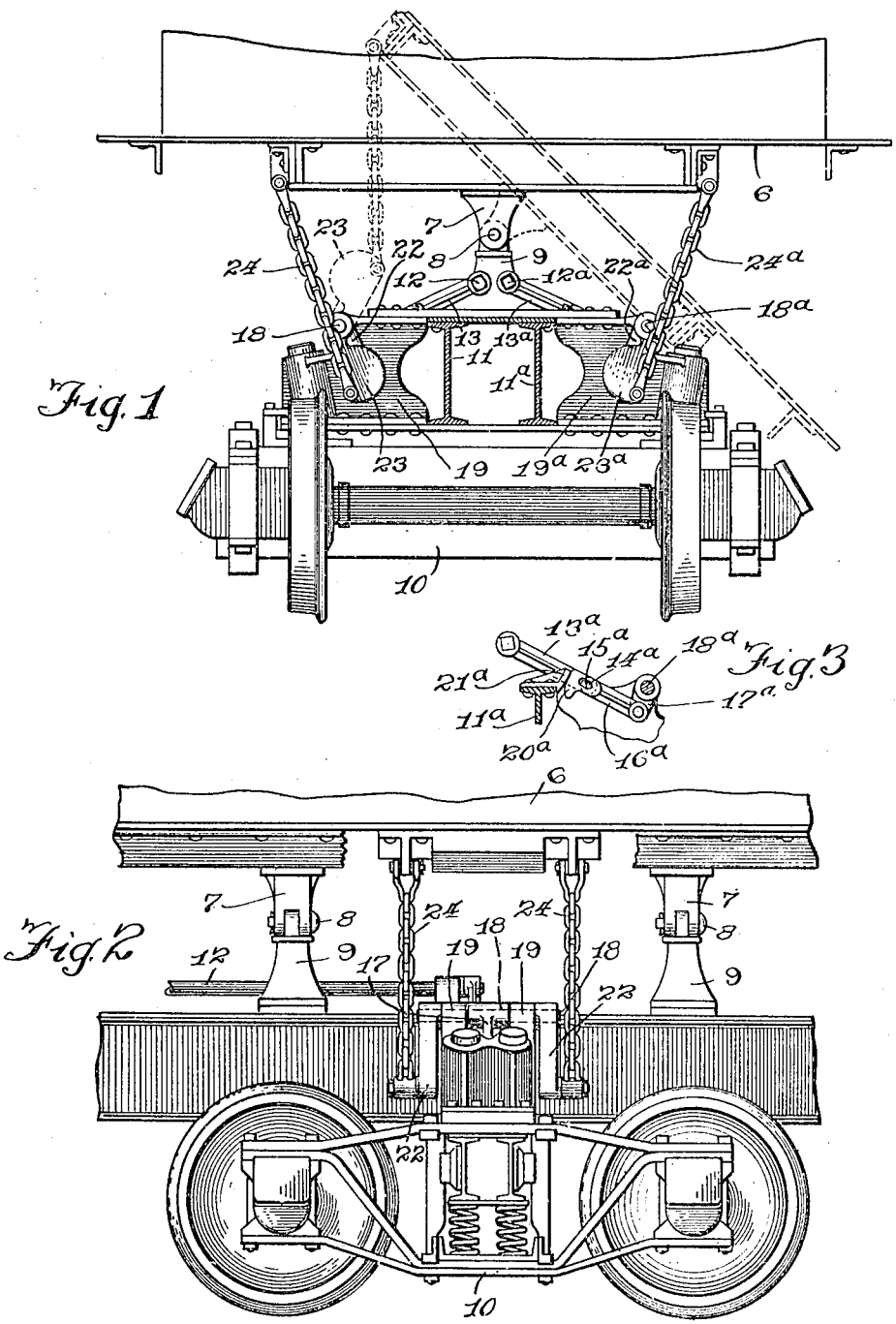

J. B. RHODES.
DUMP CAR.
APPLICATION FILED MAY 19, 1916.

1,256,164.

Patented Feb. 12, 1918.
2 SHEETS—SHEET 2.

Witness.
L. B. Graham

Inventor:
Jay B. Rhodes,
by Adams Jackson,
Attys.

UNITED STATES PATENT OFFICE.

JAY BYRON RHODES, OF KALAMAZOO, MICHIGAN, ASSIGNOR TO WESTERN WHEELED SCRAPER COMPANY, OF AURORA, ILLINOIS, A CORPORATION OF ILLINOIS.

DUMP-CAR.

1,256,164.    Specification of Letters Patent.    Patented Feb. 12, 1918.

Application filed May 19, 1916. Serial No. 98,496.

*To all whom it may concern:*

Be it known that I, JAY B. RHODES, a citizen of the United States, and a resident of Kalamazoo, in the county of Kalamazoo and State of Michigan, have invented certain new and useful Improvements in Dump-Cars, of which the following is a specification, reference being had to the accompanying drawings.

My invention relates to power-operated dump-cars in which the car bed is arranged to be tilted to discharge its load at either side of the truck, the tilting of the bed in one direction or the other being effected by vertically-movable plungers mounted in cylinders at the opposite sides of the car, the cylinders being connected with some suitable source of supply of compressed air. In such cars it is necessary to provide devices connected with opposite sides of the car bed for holding the bed in its normal or horizontal position while receiving and transporting the load, and means must be provided for releasing the locking or retaining device at the side opposite that at which the load is to be dumped so that the dumping operation may be effected. When the bed is restored to its horizontal position after dumping, provision must be made for preventing it from moving beyond such position and tilting toward the opposite side. My present invention has more particularly to do with the devices for holding the bed in its normal position and for releasing it when the tilting mechanism is operated to permit tilting in the desired direction, and its object is to provide certain improvements by which the locking device at the side of the car opposite that at which the load is dumped will be automatically restored to operative position as soon as the bed has been righted. I accomplish this object as illustrated in the drawings and as hereinafter described. That which I regard as new is set forth in the claims.

In the accompanying drawings,—

Figure 1 is an end view of a car illustrating my improvements, part of the under frame of the car being in section;

Fig. 2 is a partial side view;

Fig. 3 is a detail, partly in section, illustrating a part of the locking mechanism.

Referring to the drawings,—

Figure 4:
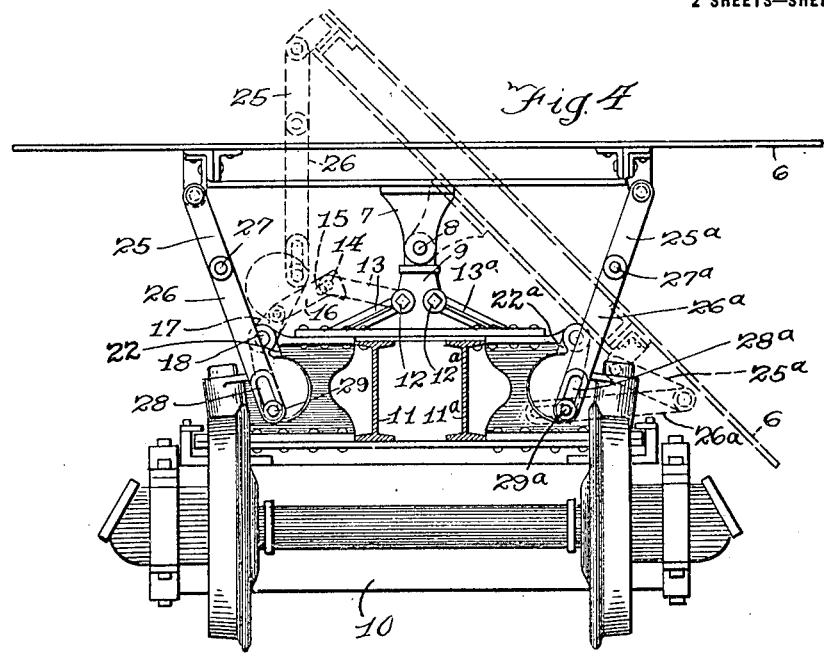
Figs. 4 and 5 are views similar, respectively, to Figs. 1 and 2, showing a modified arrangement.
Figure 5:
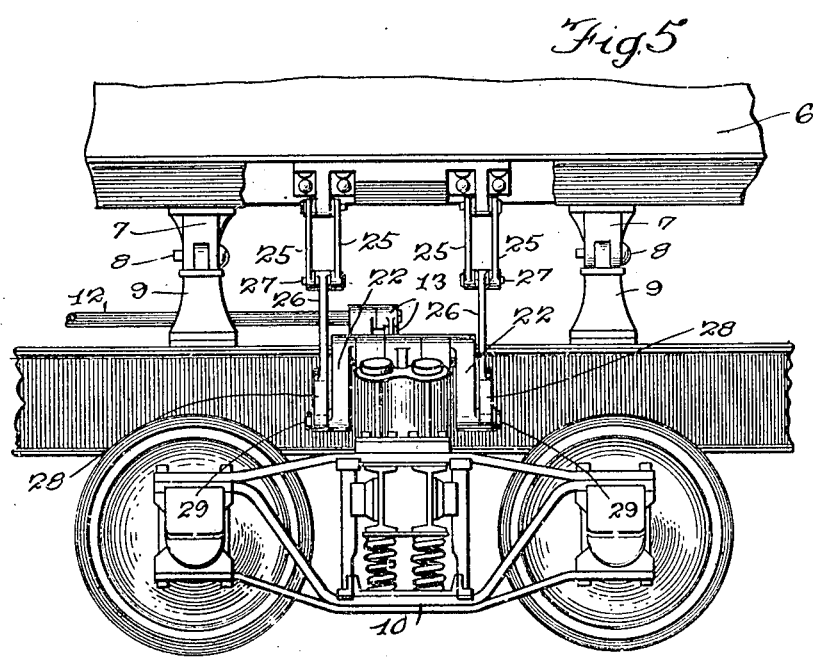

6 indicates the car bed, which is mounted upon a series of rockers 7 disposed longitudinally of the car, centrally thereof, and turning upon pivots 8 which are mounted in pedestals 9 supported by the under frame of the car. Such under frame comprises the usual trucks 10 and draft rigging, and need not be particularly described. In the construction shown I employ two longitudinal I-beams 11—11$^a$ as a part of the under frame, but these are not essential. The mechanism for tilting the bed to dump it comprises two fluid-operated plungers disposed in cylinders at opposite sides of the car at the longitudinal center thereof, but as such devices form no part of my present invention they are not illustrated herein. One approved construction for that purpose is fully shown and described in my pending application filed of even date herewith, Serial No. 98,495, and another will be found in Letters Patent No. 1,168,420, granted January 18, 1916. Any suitable devices for the purpose may be employed provided they have the capacity of rocking longitudinally-disposed rock-shafts mounted on the under frame. Such rock-shafts are used in connection with my present invention, and they are indicated by the reference numerals 12—12$^a$ in the drawings. These shafts terminate adjacent to the ends of the car and are there provided with arms 13—13$^a$, in the ends of which are cross-pins 14—14$^a$. To avoid unnecessary repetition, it may be assumed that the devices at the two sides of the car are alike and that the parts at the right-hand side as shown in the drawings bear the same numbers as the corresponding parts at the left-hand side of the car with the addition of the exponent "a."
The pins 14 fit in slots 15 in links 16 pivotally connected to cranks 17 carried by shafts 18 journaled at the sides of the truck in bearings 19, as shown in Fig. 2. The links 16 are provided with heads 20 adapted when in normal position to bear against lugs 21 secured to the upper ends of the I-beams 11, as best shown in Fig. 3. These lugs are so placed that when an arm 13 and link 16 are in alinement, the head 20 bears against the lug 21, preventing the crank 17 from swinging toward the lug and consequently preventing the shaft 18 from rocking in that direction. Said shaft is, however, capable of slight movement in the opposite direction owing to the slot 15. The shaft 18 also carries at its opposite ends arms 22 having counterbalance weights 23, as shown in the drawings. In the construction shown in Figs. 1 and 2, the outer portions of the arms 22—22ᵃ are connected by chains or other suitable connections 24—24ᵃ with the bed at opposite sides of the center thereof,—preferably two chains being used at each end of each side of the car, as shown by Fig. 2. In the construction shown in Figs. 4 and 5, instead of using chains, I employ upper and lower links 25—26, the upper links (a pair being preferably used, as shown in Fig. 5) being pivoted to the car bed and being connected to the lower link by a pivot 27. The lower link is provided at its lower end with a longitudinal slot 28 which fits upon a pin 29 projecting from the arm 22. This link construction operates in substantially the same way as the chain construction shown in Figs. 1 and 2. In both forms of the device, when the parts are in the position shown in full lines in Figs. 1 and 4, the bed is locked in its horizontal or normal position, since the arms 22—22ᵃ are prevented from swinging by the toggle comprising the links 13—16, which are then in alinement, and by the engagement of the heads 20—20ᵃ with the coöperating lugs 21—21ᵃ. When, however, one or the other of the rock-shafts 12—12ᵃ is rotated by the projection of the plunger associated therewith, in the operation of raising one side of the bed to tilt the same, the arm 13 or 13ᵃ of the toggle connected with such rock-shaft swings up to the position shown in dotted lines in Fig. 4, carrying up links 16 or 16ᵃ so as to move the head thereof out of engagement with the coöperating lug. This also swings the arms 22—22ᵃ up approximately to the position shown in dotted lines, Figs. 1 and 4, permitting the bed to tilt. The corresponding parts at the opposite side of the car do not interfere with the tilting because where flexible connections are used, such as the chains 24, they simply hang pendent, and where the link construction shown in Figs. 4 and 5 is used, the links fold, as indicated at the right in Fig. 4. In either case the locking devices at the dumping side of the car remain in operative position so that when the bed is restored to its normal position they prevent it from tipping toward the opposite side under the action of the restoring plunger. As the car bed is righted the weights carried by the arms 22 cause them to swing downward, rocking the shafts 18 to which they are attached, in the opposite direction, and restoring the locking devices to operative position.

That which I claim as my invention, and desire to secure by Letters Patent, is,—

1. A dump-car, comprising a car bed, a suitable under frame on which said car bed is mounted to tilt for discharging its load, a rock-shaft extending longitudinally of the car, a shaft mounted on said under frame adjacent to one side thereof, a swinging arm carried by the latter shaft and having a counterbalance weight, means connecting the outer portion of said arm with the car bed adjacent to one side thereof, a crank carried by the latter shaft, and toggle mechanism disposed between said crank and said rock-shaft for locking said swinging arm in its normal position.

2. A dump-car, comprising a car bed, a suitable under frame on which said car bed is mounted to tilt for discharging its load, a rock-shaft extending longitudinally of the car, a shaft mounted on said under frame adjacent to one side thereof, a swinging arm carried by the latter shaft and having a counterbalance weight, means connecting the outer portion of said arm with the car bed adjacent to one side thereof, a crank carried by the latter shaft, an arm carried by said rock-shaft, and a link connected to said crank and to the latter arm and normally having a thrust bearing on the under frame.

3. A dump-car, comprising a car bed, a suitable under frame on which said car bed is mounted to tilt for discharging its load, a rock-shaft extending longitudinally of the car, a shaft mounted on said under frame adjacent to one side thereof, a swinging arm carried by the latter shaft and having a counterbalance weight, means connecting the outer portion of said arm with the car bed adjacent to one side thereof, a crank carried by the latter shaft, an arm carried by said rock-shaft, and a link connected to said crank and to the latter arm and adapted normally to aline with such arm.

4. A dump-car, comprising a car bed, a suitable under frame on which said car bed is mounted to tilt for discharging its load, a rock-shaft extending longitudinally of the car, a shaft mounted on said under frame adjacent to one side thereof, a swinging arm carried by the latter shaft and having a counterbalance weight, means connecting the outer portion of said arm with the car bed adjacent to one side thereof, a crank carried by the latter shaft, an arm carried by said rock-shaft, and a link forming a slotted connection between said crank and the latter arm and adapted normally to aline with such arm.

5. A dump-car, comprising a car bed, a suitable under frame on which said car bed is mounted to tilt for discharging its load, a rock-shaft extending longitudinally of the car, a shaft mounted on said under frame adjacent to one side thereof, a swinging arm carried by the latter shaft and having a counterbalance weight, means connecting the outer portion of said arm with the car bed adjacent to one side thereof, a crank carried by the latter shaft, an arm carried by said rock-shaft, a link connected to said crank and to the latter arm and adapted normally to aline with such arm, and a member carried by said link and adapted to engage said under frame when said link is in its normal position.

6. A dump-car, comprising a car bed, a suitable under frame on which said car bed is mounted to tilt for discharging its load, a rock-shaft extending longitudinally of the car, a shaft mounted on said under frame adjacent to one side thereof, a swinging arm carried by the latter shaft and having a counterbalance weight, means connecting the outer portion of said arm with the car bed adjacent to one side thereof, a crank carried by the latter shaft, an arm carried by said rock-shaft, a link forming a slotted connection between said crank and the latter arm and adapted normally to aline with such arm, and a member carried by said link and adapted to engage said under frame when said link is in its normal position.

JAY BYRON RHODES.

Copies of this patent may be obtained for five cents each, by addressing the "Commissioner of Patents, Washington, D. C."